US012695522B2

(12) United States Patent
Farhadi

(10) Patent No.: US 12,695,522 B2
(45) Date of Patent: Jul. 28, 2026

(54) METHOD FOR AN INTERFERENCE-AWARE AND ADAPTIVE TRANSMISSION AND RECEPTION STRATEGY

(71) Applicant: Telefonaktiebolaget LM Ericsson (publ), Stockholm (SE)

(72) Inventor: Hamed Farhadi, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 317 days.

(21) Appl. No.: 18/289,624

(22) PCT Filed: May 7, 2021

(86) PCT No.: PCT/EP2021/062195
§ 371 (c)(1),
(2) Date: Nov. 6, 2023

(87) PCT Pub. No.: WO2022/233435
PCT Pub. Date: Nov. 10, 2022

(65) Prior Publication Data
US 2024/0322923 A1    Sep. 26, 2024

(51) Int. Cl.
*H04B 17/345* (2015.01)
*H04B 7/06* (2006.01)
(Continued)

(52) U.S. Cl.
CPC ......... *H04B 17/345* (2015.01); *H04B 7/0626* (2013.01); *H04L 1/0003* (2013.01); *H04W 24/10* (2013.01)

(58) Field of Classification Search
CPC ... H04B 17/345; H04B 7/0626; H04L 1/0003; H04W 24/10
See application file for complete search history.

(56) References Cited

U.S. PATENT DOCUMENTS

2014/0204857 A1    7/2014  Mallik et al.
2015/0117327 A1    4/2015  Nordström et al.
(Continued)

FOREIGN PATENT DOCUMENTS

WO    2016/165753 A1    10/2016
WO    2021/068808 A1    4/2021

OTHER PUBLICATIONS

International Search Report and Written Opinion issued in International Application No. PCT/EP2021/062195 issued on Jan. 31, 2022 (14 pages).
(Continued)

*Primary Examiner* — Sulaiman Nooristany
(74) *Attorney, Agent, or Firm* — Rothwell, Figg, Ernst & Manbeck, P.C.

(57) ABSTRACT

A computer implemented method performed by a receiving node (110) in a wireless communications network (100), for detecting information in a first transmit signal (121) sent from a primary transmitting node (120) in the network, where the first transmit signal is comprised in a received signal (112). The received signal also comprises one or more interfering secondary transmit signals (131, 132). The method comprises determining a received signal quality associated with at least one of the secondary transmit signals (131, 132), obtaining a computer implemented classification model configured to classify a transmit signal (121, 131) into a successive interference cancelation, SIC, group based on the received signal quality, classifying the at least one secondary transmit signal (131, 132) using the classification model, and, if one or more of the secondary transmit signals are classified into the SIC group, detecting the information in the first transmit signal (121) based on a SIC information decoding strategy involving the one or more secondary transmit signals (131, 132) classified into the SIC group.

19 Claims, 4 Drawing Sheets

(51) Int. Cl.
    *H04L 1/00*        (2006.01)
    *H04W 24/10*     (2009.01)

(56)                 References Cited

U.S. PATENT DOCUMENTS

| | | | |
|---|---|---|---|
| 2018/0176048 A1* | 6/2018 | Qian | H04L 25/0238 |
| 2025/0192832 A1* | 6/2025 | Dizdar | H04W 24/02 |

OTHER PUBLICATIONS

Pischella, M. et al., "Cooperative allocation for underlay cognitive radio systems", 2013 IEEE 14th Workshop on Signal Processing Advances in Wireless Communications (SPAWC), Jun. 16, 2013 (5 pages).

\* cited by examiner

METHOD FOR AN INTERFERENCE-AWARE AND ADAPTIVE TRANSMISSION AND RECEPTION STRATEGY

CROSS REFERENCE TO RELATED APPLICATIONS

This application is a 35 U.S.C. § 371 National Stage of International Patent Application No. PCT/EP2021/062195, filed 2021 May 7.

TECHNICAL FIELD

The present disclosure relates to radio transceivers for use in both wired and wireless communication networks. There are disclosed methods and devices for adaptive transmission and reception strategies in a radio transceiver.

BACKGROUND

In multi-user communication networks, where multiple user equipment (UEs) in a cell or multiple cells communicates with next generation node Bs (gNBs), received signals are subject to interference which degrades communication network performance. There have been several strategies to mitigate such interference. For example, multiple antennas at the transmitters and receivers can be used to beamform the transmit signal to avoid causing interference to receivers not intended to transmit to, and to filter the received signal to suppress the received interference. Another strategy is to use successive interference cancelation (SIC), which can be summarized as a method that compensates for the impact of interference by first detecting and decoding the interference and thereafter removing the contribution of interference from the received signal before decoding the desired signal. However, there is a need for improved decoding strategies.

SUMMARY

It is an object of the present disclosure to provide improved decoding methods and improved corresponding nodes in a wireless communications network.

This object is at least in part obtained a computer implemented method performed by a receiving node in a wireless communications network, for detecting information in a first transmit signal sent from a primary transmitting node in the network, where the first transmit signal is comprised in a received signal. The received signal also comprises one or more interfering secondary transmit signals. The method comprises determining a received signal quality associated with at least one of the secondary transmit signals, obtaining a computer implemented classification model configured to classify a transmit signal into a successive interference cancelation (SIC) group based on the received signal quality, classifying the at least one secondary transmit signal using the classification model, and, if one or more of the secondary transmit signals are classified into the SIC group, detecting the information in the first transmit based on a SIC information decoding strategy involving the one or more secondary transmit signals classified into the SIC group.

The method performed by the receiving node can thus adapt the decoding strategy to deal with interference in, e.g., multi-user signal detection in an uplink scenario. Since SIC decoding may only be suitable in specific circumstances, and for certain types of signals, identifying when to use such strategy and when to use another strategy is highly likely to improve the detection performance of the receiver, which may include performance metrics such as energy efficiency, spectral efficiency, processing resources, speed, throughput, error rates etc. The proposed method provides flexibility to deal with interference in dense scenarios using massive antenna systems, and also reduces computational complexity of the decoding process, since not all secondary transmit signals need to be detected using SIC, only those where SIC is expected to improve overall receiver performance.

According to aspects, the computer implemented classification model is configured to also classify the transmit signal into a treat interference as noise (TIN) group based on the respective received signal quality. In this case, the method comprises detecting the information in the first transmit signal based on a direct decoding strategy involving any secondary transmit signals classified into the TIN group. The disclosed method provides a low complexity solution for identifying interference from users (that are transmitting the secondary transmit signals) which should be removed using SIC and interference from users that is preferably treated as noise in the received signal. The number of possible options scales exponentially with the number of the interfering users, and the proposed low-complex decision method reduces the processing delay and the complexity of the receiver.

According to aspects, the classifying is based on a predicted detection performance of detecting the information in the first transmit signal conditioned on the classification of the secondary transmit signals. The classification can, e.g., assign a secondary transmit signal into the SIC group if it is predicted that this particular classification results in a lower error rate of the detected information in the first transmit signal compared to if that secondary transmit signal is not classified into the SIC group.

According to aspects, the method comprises determining the received signal quality based on any of signal to interference and noise ratio (SINR), channel state information (CSI), modulation and coding scheme (MCS), received signal power, one or more node positions, and transmitted power. In general, the received signal quality can be any characteristic of the signal that can affect decoding performance. It is an advantage that the proposed methods are versatile in that several different received signal quality metrics can be used.

According to aspects, the method comprises obtaining the computer implemented classification model as a model based on any of a look up table and an analytical function. This can enable a quick setup of the classification model.

According to aspects, the method comprises obtaining the computer implemented classification model as a model based on any of a neural network, a random forest structure, a support vector machine model, a logistic regression algorithm, a Bayes algorithm, a decision tree algorithm, and a K-nearest neighbors' algorithm. Such machine learning models generally relate to techniques where a model having a certain pre-determined structure is adapted to provide a desired function by means of some form of training mechanism. Machine learning techniques provide versatility and adaptability in different types of scenarios. Thus, utilizing machine learning models to identify the best decoding strategy can enable improved detection performance in a large number of circumstances. In fact, techniques based on machine learning are often a preferred means of implementation for many of the methods proposed herein.

According to aspects, the method comprises obtaining the computer implemented classification model as a model trained using a-priori recorded values of received signal quality. Thus, the classification model can be operated in a number of use case of interest. This enables efficient and accurate classification of the interfering transmit signal.

According to aspects, the method comprises training the computer implemented classification model using recorded values of received signal quality and corresponding detection performance of detecting the information of the first transmit signal. This way, the classification model can continuously be updated to provide better classification, i.e., classification resulting in better detection performance.

According to aspects, the method comprises obtaining the computer implemented classification model as a model configured to determine a transmit parameter for an upcoming transmission of a transmit signal based on the received signal quality. In this case, the method further comprises determining a transmit parameter for an upcoming transmission of a transmit signal using the classification model, and communicating the transmit parameter to a transmitting node. This feedback can be used to update an upcoming transmit signal to improve detection performance of the receiving node. In other words, the classification model can determine if any future transmission of the transmit signals should be modified to improve detection performance. This adds another degree of freedom when trying to improve detection performance.

According to aspects, the method comprises determining a transmit parameter comprising any of MCS, transmit power, and a hardware parameter. The transmit parameter may, in general, be any parameter affecting the decoding of the receiving node, which provides an increased degree of versatility to the disclosed methods.

According to aspects, the method comprises determining the transmit parameter based on a predicted detection performance of detecting the information of the first transmit signal. Updating the transmit parameter may be relevant for the first transmit signal and any secondary transmit signals. The determined transmitter parameter is communicated to the corresponding node which transmitted the transmit signal.

According to aspects, the method comprises classifying the at least one secondary transmit signal using the classification model based on a predicted detection performance metric comprising any of spectral efficiency, energy consumption, power levels, processing resources, and detection error probability.

According to aspects, the wireless communications network is an orthogonal frequency-division multiplexing (OFDM) system, and wherein the transmit signals are on a same resource block in the OFDM system.

According to aspects, the method according to the discussion above is performed by a next generation node B (gNB) of a third generation partnership program (3GPP) defined wireless communication system.

According to aspects, the method according to the discussion above is performed by a wireless device of a 3GPP defined wireless communication system.

There is also disclosed herein computer programs, computer program products, and control units associated with the above-mentioned advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

The present disclosure will now be described in more detail with reference to the appended drawings, where
FIGS. 1 and 2 schematically illustrates communication networks.

DETAILED DESCRIPTION

Figure 1:
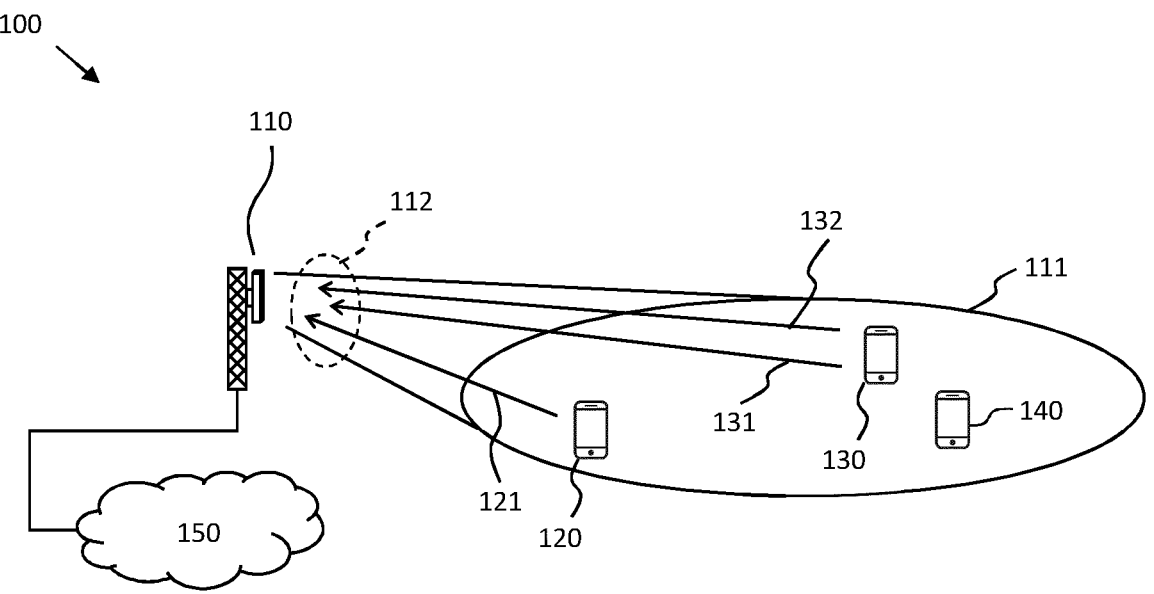

Aspects of the present disclosure will now be described more fully with reference to the accompanying drawings. The different devices and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

Figure 2:
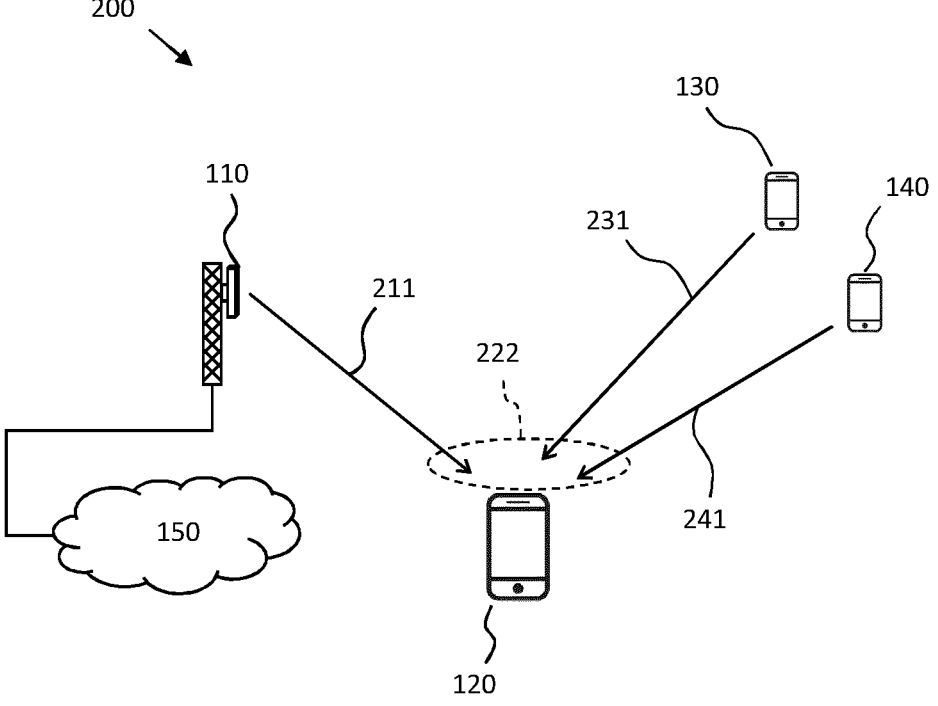

The present disclosure relates to wireless communication networks and wireless systems in general. However, the techniques disclosed herein may also be used in wired systems. FIGS. 1 and 2 schematically illustrate examples of communication systems 100, 200 comprising a radio access network node 110 which provide wireless access over a coverage area 111. The radio access network node is connected to a higher instance 150, such as to a core network. Wireless devices 120, 130, 140 of different types connect to the core network, e.g., via the radio access network nodes 110.

The communication system 100, 200 may be part of a fifth generation (5G) communication system (5GS) as defined by the third generation partnership program (3GPP). However, the techniques disclosed herein are generally applicable, and can be implemented in other communication systems also. The method disclosed herein, for detecting information, may be performed by a next generation node B (gNB) 110 of a 3GPP-defined wireless communication system 100, 200. The method may also be performed by a wireless device 120 of a 3GPP-defined wireless communication system 100, 200. In general, however, the method may be performed by any node in any wireless communications network.

As mentioned, interference degrades performance in a communication network. One strategy is to use successive interference cancelation (SIC) to improve detection performance when the interference becomes a problem. Yet another strategy is simply to treat the interference as noise. However, each of these strategies is suitable for specific circumstances and identifying the best strategy to deal with the different interference components is challenging.

Therefore, there is disclosed a computer implemented method performed by a receiving node 110, 120 in a wireless communications network 100, 200, for detecting information in a first transmit signal 121, 211 sent from a primary transmitting node 120, 110 in the network, where the first transmit signal is comprised in a received signal 112, 222. The received signal also comprises one or more interfering secondary transmit signals 131, 132, 231, 241. The interfering secondary transmit signals can originate from secondary nodes 130, 140 in the network, which can be UEs and/or gNBs in the network. However, interfering secondary transmit signals can also be other signals from the primary transmitting node, e.g., in multiple input multiple output (MIMO) communication, such as inter-layer interference. The interfering secondary transmit signals can even originate from the receiving node itself, i.e., self-interference.

Figure 7:
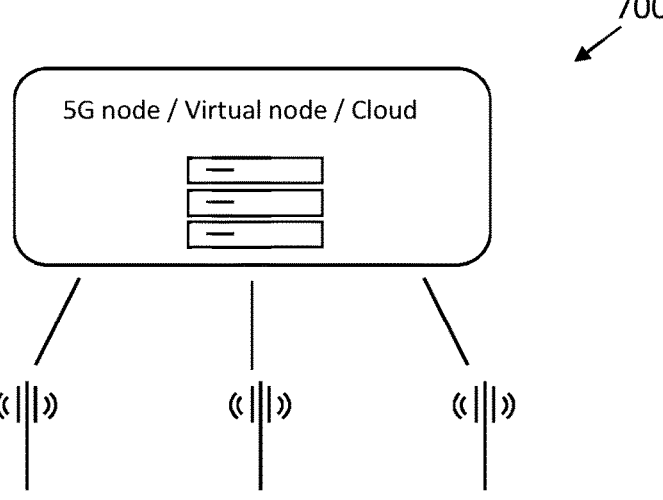

As mentioned, the receiving node and the transmitting nodes can be any node in a wireless communications network. In FIG. 1, the receiving node is a base station 110, the primary transmitting node is a UE 120, and a secondary transmitting UE 130 transmits two interfering signals 131, 132. In FIG. 2, the receiving node is instead a UE 120, the primary transmitting node is a base station 110, and two secondary transmitting UEs 130, 140 transmits respective interfering signals 231, 241. Any of the nodes in the network may be realized in a virtual manner. An example realization 700 is illustrated in FIG. 7, which shows a 5G node which could be deployed in a centralized manner or in a virtual node in the communications network 100. The split between the physical node and the centralized node can be on different levels. Parts of the herein proposed methods may of course also be implemented on a remote server comprised in a cloud-based computing platform.

Figure 3:
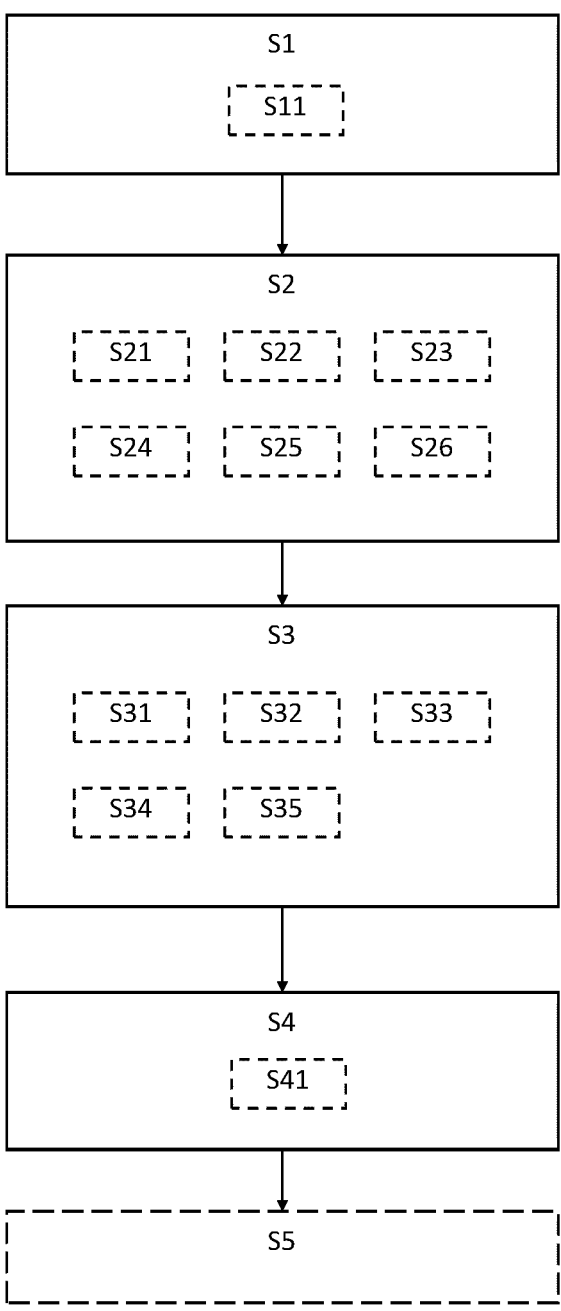
FIGS. 3 and 4 are flow charts illustrating methods,
FIG. 5 schematically illustrates a control unit.

With reference to FIG. 3, the proposed method comprises determining S1 a received signal quality associated with at least one of the secondary transmit signals 131, 132, 231, 241, obtaining S2 a computer implemented classification model configured to classify a transmit signal 121, 131, 231, 241 into a successive interference cancelation (SIC) group based on the received signal quality, classifying S3 the at least one secondary transmit signal 131, 132, 231, 241 using the classification model, and, if one or more of the secondary transmit signals are classified into the SIC group, detecting S4 the information in the first transmit signal 121, 211 based on a SIC information decoding strategy involving the one or more secondary transmit signals 131, 132, 231, 241 classified into the SIC group.

In other words, the method performed by the receiving node can adapt the decoding strategy to deal with interference in, e.g., multi-user signal detection in an uplink scenario. Since SIC decoding may only be suitable under specific circumstances, identifying when to use such strategy and when to use another strategy improves detection performance of the receiver. Detection performance may include any of energy efficiency, spectral efficiency, processing resources, speed, throughput, error rates etc. Specifically, the classifying S34 may be based on a predicted detection performance of detecting the information in the first transmit signal 121, 211 conditioned on the classification of the secondary transmit signals 131, 132, 231, 241. The classification can, e.g., classify a secondary transmit signal into the SIC group if it is predicted that this particular classification results in a lower error rate of the detected information in the first transmit signal compared to if that secondary transmit signal is not classified into the SIC group.

In general, using a SIC decoding strategy in non-optimal conditions can result in unnecessary processing and therefor unnecessary power consumption and may even degrade the signal fidelity. Using SIC mainly in optimal conditions thus improves performance of the network. When SIC is effectively utilized, it can reduce required radio resources, such as transmit power and spectrum. For instance, in the presence of severe interference, instead of increasing transmit power of the intended transmitter, performing SIC can remove the contribution of the interference before decoding the desired signal and thus there is no need for a power boost to mitigate the interference.

SIC is a well-known technique used by a receiver that enables decoding of two or more packets (e.g., in different transmit signals) that arrived simultaneously at the receiver. As an example, SIC can be achieved by first decoding a stronger signal (among a combined signal comprising a plurality of simultaneously received signals/packets), and thereafter subtracting it from the combined signal and decoding the difference. In an example embodiment, the SIC decoding can functionally be described as follows. In this example, the order of interfering transmit signals for which the interference contribution need to be removed by performing SIC is optimized. The optimization objective can be to maximize the overall signal to interference and noise ratio (SINR) after applying SIC for all signals in the SIC group. A possible optimization scheme is: compute a SINR value for each transmit signal in the SIC group; select the signal with the highest SINR value; perform SIC for the selected transmit; remove that particular signal from the SIC group; repeat the above steps until the interference contribution from the last transmit signal is removed from the received signal; and decode the desired signal.

In another example, the order of performing SIC for different interfering transmit signals in the SIC group can be optimized as a function of the estimated CSI to maximize an objective function, e.g., the achieved throughput or sum-rate or to minimize an objective function e.g., the total transmit power. For example, the interfering transmit signal with the strongest channel and transmit power can be the first in the order of SIC decoding, and the next one would be the transmit signal with the second strongest channel gain and transmit power. This can continue until all signals have been decoded.

The disclosed computer implemented classification model may optionally be configured S21 to also classify the transmit signal 121, 131, 231, 241 into a treat interference as noise (TIN) group based on the respective received signal quality. In that case, information in the first transmit signal 121, 211 can be detected S41 based on a direct decoding strategy involving any secondary transmit signals 131, 132, 231, 241 classified into the TIN group. One example of a direct decoding strategy is to simply decode the first transmit signal without any particular signal processing considering the interfering transmit signals. In other words, the interference from the signals classified into the TIN group is treated as any other noise in the system (e.g., thermal noise).

As a consequence, in scenarios where there are multiple interfering signals, the disclosed method provides a low complexity solution to identify that the interference from which users need to be removed using SIC and the interference from which users need to be treated as noise in the received signal. The number of possible options scales exponentially with the number of the interfering users, and the proposed low-complex decision method reduces the processing delay and the complexity of the receiver. The classification model may further be configured to classify the transmit signal 121, 131, 231, 241 into other groups based on the respective received signal quality, where each group is associated with a respective decoding strategy.

The disclosed methods may furthermore comprise determining S11 the received signal quality based on any of signal to interference and noise ratio (SINR), channel state information (CSI), modulation and coding scheme (MCS), received signal power, one or more node positions, and transmitted power. Any such parameter of the received signal quality can, e.g., be estimated using pilots during uplink transmission. In general, the received signal quality can be any characteristic of the signal that can affect decoding performance.

As an example, in multi-user uplink scenarios, where the received signal at a gNB is subject to interference from other UEs, the specific decoding strategy may depend on a relative strength of the interference and channel gains. The gNB may decode the intended signal by treating the interference as noise, or it may perform successive interference cancellation by using a SIC decoding strategy. The receiver at the gNB decides under which conditions to switch to either of these decoding strategies, depending on scenario and other receiver conditions.

To identify the best decoding strategy, machine learning models can be utilized with advantage. Machine learning relates generally to techniques where a model having a certain pre-determined structure is adapted to provide a desired function by means of some form of training mechanism. Machine learning techniques have gained tremendous interest over recent years due to the versatility and adaptability of the methods in different types of applications. For example, the method may comprise obtaining S23 the computer implemented classification model as a model based on any of a neural network, a random forest structure, a support vector machine model, a logistic regression algorithm, a Bayes algorithm, a decision tree algorithm, and a K-nearest neighbors' algorithm. These models are known in general and will therefore not be discussed in more detail herein. The classification model may also be based on other algorithms/models.

The method may comprise obtaining S24 the computer implemented classification model as a model trained using a-priori recorded values of received signal quality. This training can be used as initial training of the model. Such training is preferably done off-line, i.e., in a test environment such as a lab. However, it can of course be done online in the communication network. The model can be trained to classify the transmit signals based on corresponding detection performance of detecting the information of the first transmit signal 121, 211.

The training can be supervised and/or unsupervised. A supervised training can be based on a set of training samples with labeled transmit signals and corresponding signal qualities. In unsupervised training, the model can be trained such that a cost function is minimized as of applying the classification algorithm. For example, in single-antenna systems, signals that contribute to strong interference are assigned to the SIC group and the ones that contribute to weak interference are assigned to TIN group. In another example, in the case of a multi-antenna receiver, the UEs for which the received signal subspace has large overlap with the signal subspace of the primary UE are assigned to SIC group since these UEs contribute with large interference in the received signal, and the UEs for which this overlap is small are assigned to the TIN group. In other words, the UEs for which the angle of arrival overlaps or is close to that of the primary UE are assigned to SIC group, and the other ones are assigned to TIN group since multi antennas at receiver enables to receive signal from the direction of interest, and as far as the interfering UEs transmit signals in directions that does not overlap with that of the primary UE, the interference contribution would be low.

The method may comprise training S25 the computer implemented classification model using recorded values of received signal quality and corresponding detection performance of detecting the information of the first transmit signal 121, 211. This way, the classification model can continuously be updated to provide better classification, i.e., classification resulting in better detection performance.

In an example embodiment, the interfering transmit signals 121, 131, 231, 241 of the received signal are classified into the SIC group and into the TIN group. The inputs of the classification model are respective estimated CSI and transmit power of the transmit signals. The classification is then performed using a pre-trained machine learning model, where the inputs into the model are K channel gain values (or vectors in the case of multi-antenna receiver) and K transmit power values, where K is the number of interfering transmit signals, and the output is a binary classification into the two groups for each transmit signal.

The classification model may classify a single interfering transmit signal into the SIC group (or other groups) based on the received signal quality of that transmit signal. The classification model may also consider the received signal qualities of a plurality of transmit signals. It is further possible to classify a plurality of transmit signals simultaneously.

The classification is not necessarily based on models related to machine learning. In other words, the method may also comprise obtaining S22 the computer implemented classification model as a model based on any of a look up table and an analytical function. The look up table may comprise detection performance of detecting the information of the first transmit signal 121, 211 for the classification versus received signal quality of at least one of the secondary transmit signals 131, 132, 231, 241. One example could be error rate of the detected information when classifying interfering transmit signals into the different groups for different values of received signal powers of the transmit signal. The look up table may comprise data which is acquired from measurements or simulations. Furthermore, the look up table may comprise interpolated data to increase the resolution. Such interpolation may be achieved by analytical functions. Analytical functions may also replace the look up table completely, or in part, or be used in combination with the look up table.

To further increase detection performance of the receiving node, the method may include the receiving node transmitting feedback to the any of the transmitting nodes in the network. This feedback can be used to update an upcoming transmit signal to improve detection performance of the receiving node. In other words, the method may comprise obtaining S26 the computer implemented classification model as a model configured to determine a transmit parameter for an upcoming transmission of a transmit signal 121, 131, 132, 211, 231, 241 based on the received signal quality. In that case, the method further comprises determining S31 a transmit parameter for an upcoming transmission of a transmit signal 121, 131, 132, 211, 231, 241 using the classification model, and communicating S5 the transmit parameter to a transmitting node 120, 130, 140, 110. The classification model can thus determine if any future transmission of the transmit signals should be modified to, e.g., improve detection performance. This adds another degree of freedom when trying to improve the detection performance. Thus, the method may comprise determining S33 the transmit parameter based on a predicted detection performance of detecting the information of the first transmit signal 121, 211. Updating the transmit parameter may be relevant for the first transmit signal 121, 211 and any secondary transmit signal 131, 132, 231, 241. The determined transmitter parameter is communicated to the corresponding node which transmitted the transmit signal.

In particular, the method may comprise determining S32 a transmit parameter comprising any of MCS, transmit power, and a hardware parameter. The transmit parameter may, in general, be any parameter affecting the decoding of the receiving node. Hardware parameters can be bias voltages or currents, resolution of the digital to analog converter etc.

In an example implementation of the proposed technique, the receiving node (e.g., gNB) computes one or more transmit parameters (e.g., UE transmit power and MCS index) and sends the recommended parameters to the transmitter (e.g., UE). The transmitter then performs upcoming transmissions with the updated transmit parameters. The transmit parameters can be computed as follows: an equivalent SINR is computed after applying SIC decoding, and the transmit parameters comprising transmit power and MCS index are computed to improve detection performance or network performance in general, where the transmit power of a transmitter can be adapted for, e.g., to minimize a required transmit power (which can lower energy consumption), and where the MCS index for a transmit signal can be adapted to maximize throughput for a given transmit power.

The method may comprise classifying S35 the at least one secondary transmit signal 131, 132, 231, 241 using the classification model based on a predicted detection performance metric comprising any of spectral efficiency, energy consumption, power levels, processing resources, and detection error probability.

The wireless communications network 100, 200 may be an orthogonal frequency-division multiplexing (OFDM) system, and wherein the transmit signals 121, 131, 132, 211, 231, 241 are on a same resource block in the OFDM system. The OFDM system may include any variant of OFDM, such as cyclic prefix, discrete Fourier transform spread (DFTS), frequency-domain filtered DFTS etc. In general, however, the wireless communications network can be any type of system, such as code-division multiple access etc.

Below follows an example implementation of the disclosed method. The following is considered: an UL scenario in a network with a gNB as the receiving node and three UEs (UE1, UE2, UE3) as transmitting nodes, where the different strategies can be conducted for decoding of the received signal from UE1 by either treating the signal from UE2 and UE3 as noise or performing SIC or a combination of these. To be able to apply each of these decoding strategies, certain conditions need to be satisfied as the ones listed in Table 1 below. The received signal can be modeled as follows $$y_1 = h_{11}x_1 + h_{12}x_2 + h_{13}x_3 + n,$$

where $x_i$ represents the transmitted signal by the ith UE and $h_{1i}$ represents the channel from the i:th UE to the gNB (i∈ {1,2,3}), and n is the receiver noise with power $N_0$. In this example, it is desired to decode the signal from UE1 while the signal from UE2 and UE3 are treated as interference. The interfering transmit signals from the UEs (UE3 and UE2 in this example) are classified in tow groups (TIN or SIC) based on conditions specified in column "conditions on interference", where the conditions depends on the channel gains, transmit powers, and transmission rates (MCS indices). Here, $R_i$ is the transmission rate of the i:th UE and $p_i$ is the transmit power of the i:th UE. For each classification of the interfering transmit signal, a specific decoding strategy can be applied as specified in column "Decoding strategy". The maximum rate for UE1 can be specified based on the decoding strategy that can be applied. This can be used to set the transmission rate (MCS index) or to adjust the transmission power for a given MCS index.

TABLE 1

| Example implementation of the disclosed method. | | | | |
|---|---|---|---|---|
| Interfering UE classes | | Decoding | Conditions on | Maximum transmission |
| TIN | SIC | strategy | interference | rate of UE1 |
| UE2 UE3 | | Decode the received message for UE1 by treating the interference from UE2 and UE3 as noise. | $R_3 > \log_2\left(1 + \dfrac{\|h_{13}\|^2 p_3}{\|h_{12}\|^2 p_2 + \|h_{11}\|^2 p_1 + N_0}\right)$ $R_2 > \log_2\left(1 + \dfrac{\|h_{12}\|^2 p_2}{\|h_{13}\|^2 p_3 + \|h_{11}\|^2 p_1 + N_0}\right)$ | $R_1 < \log_2\left(1 + \dfrac{\|h_{11}\|^2 p_1}{\|h_{12}\|^2 p_2 + \|h_{13}\|^2 p_3 + N_0}\right)$ |
| UE2 | UE3 | Decode the received message from UE1 by treating the received interference from UE2 as noise, and performing SIC on UE3. | $R_3 < \log_2\left(1 + \dfrac{\|h_{13}\|^2 p_3}{\|h_{12}\|^2 p_2 + \|h_{11}\|^2 p_1 + N_0}\right)$ $R_2 > \log_2\left(1 + \dfrac{\|h_{12}\|^2 p_2}{\|h_{11}\|^2 p_1 + N_0}\right)$ | $R_1 < \log_2\left(1 + \dfrac{\|h_{11}\|^2 p_1}{\|h_{12}\|^2 p_2 + N_0}\right)$ |
| UE3 | UE2 | Decode the received message from UE1 by treating the received interference from UE3 as noise, and performing SIC on UE2. | $R_2 < \log_2\left(1 + \dfrac{\|h_{12}\|^2 p_2}{\|h_{13}\|^2 p_3 + \|h_{11}\|^2 p_1 + N_0}\right)$ $R_3 > \log_2\left(1 + \dfrac{\|h_{13}\|^2 p_3}{\|h_{11}\|^2 p_1 + N_0}\right)$ | $R_1 < \log_2\left(1 + \dfrac{\|h_{11}\|^2 p_1}{\|h_{13}\|^2 p_3 + N_0}\right)$ |

TABLE 1-continued

| Example implementation of the disclosed method. | | | |
|---|---|---|---|
| Interfering UE classes | Decoding strategy | Conditions on interference | Maximum transmission rate of UE1 |
| TIN  SIC | | | |
| UE2 first, UE3 scnd | Decode the message from UE1 by first performing SIC for UE2 and next performing SIC on UE3. | $R_2 < \log_2\left(1 + \dfrac{|h_{12}|^2 p_2}{|h_{11}|^2 p_1 + |h_{13}|^2 p_3 + N_0}\right)$ $R_3 < \log_2\left(1 + \dfrac{|h_{13}|^2 p_3}{|h_{11}|^2 p_1 + N_0}\right)$ | $R_1 < \log_2\left(1 + \dfrac{|h_{11}|^2 p_1}{N_0}\right)$ |
| UE2 scnd, UE3 first | Decode the message from UE1 by first performing SIC for UE3 and next performing SIC on UE2. | $R_3 < \log_2\left(1 + \dfrac{|h_{13}|^2 p_3}{|h_{11}|^2 p_1 + |h_{12}|^2 p_2 + N_0}\right)$ $R_2 < \log_2\left(1 + \dfrac{|h_{12}|^2 p_2}{|h_{11}|^2 p_1 + N_0}\right)$ | $R_1 < \log_2\left(1 + \dfrac{|h_{11}|^2 p_1}{N_0}\right)$ |

Figure 4:
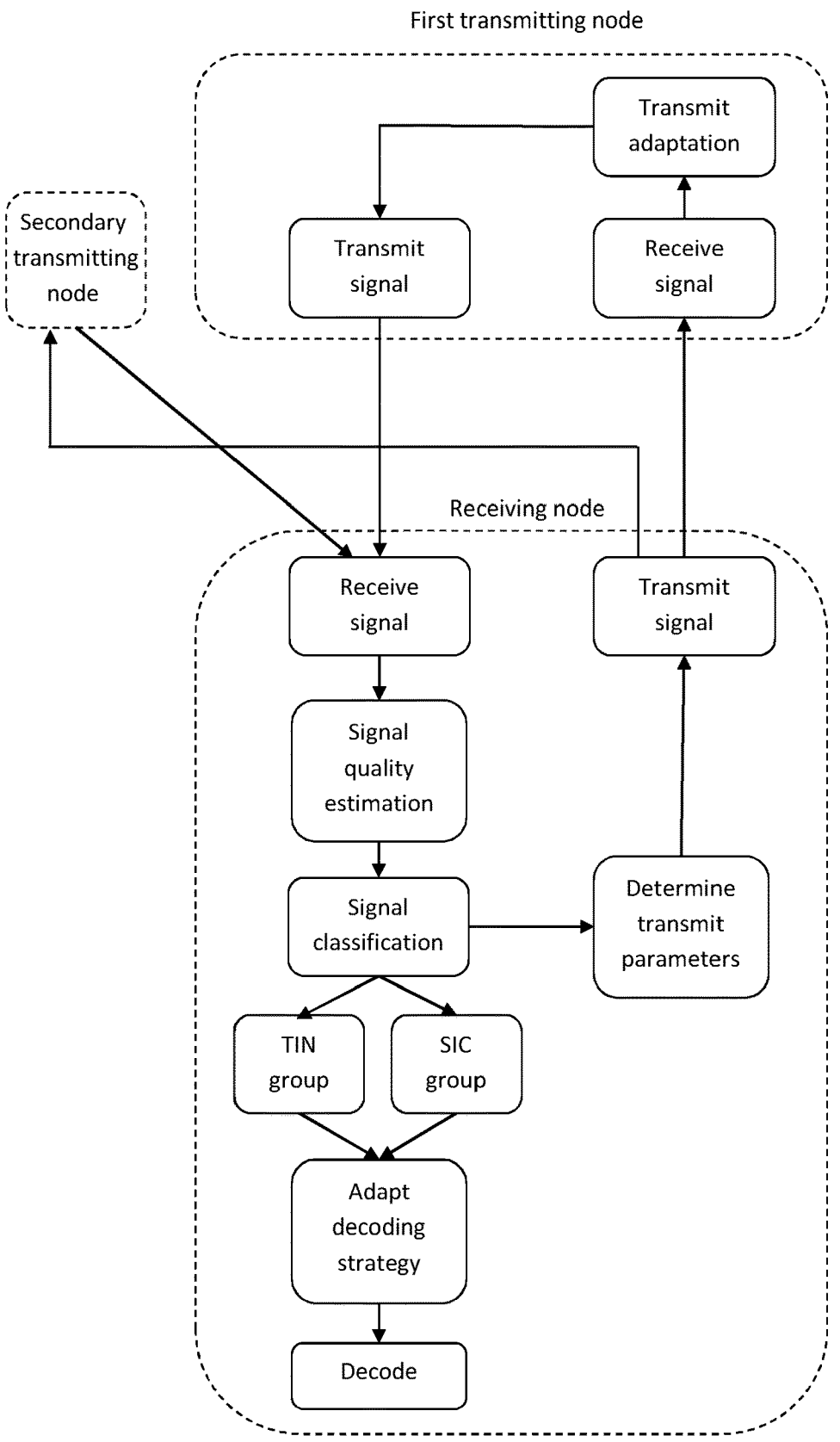

FIG. 4 is flow chart illustrating an example of the disclosed method, i.e., a method performed by a receiving node that adapts the decoding strategy to deal with interference for multi-user signal detection based on the estimated signal quality, that feedbacks transmit parameters to one or more transmitters in the network, and that adapts the transmitters based on the transmit parameters. The decoding strategy deals with the interference from each interfering user, by either "treating the interference as noise" (TIN) or performing successive interference cancellation (SIC) while decoding the signal from the primary transmitting node.

There is also disclosed herein a control unit 540 for a receiving node 110, 120 in a wireless communications network 100, 200. The control unit is arranged to detect information in a first transmit signal 121, 211 from a primary transmitting node 120, 110 in the network, where the first transmit signal is comprised in a received signal 112, 222. The received signal also comprises one or more secondary transmit signals 131, 132, 231, 241. The control unit comprises: processing circuitry 510; a network interface 520 coupled to the processing circuitry 510; and a memory 530 coupled to the processing circuitry 510. The memory comprises machine readable computer program instructions that, when executed by the processing circuitry, causes the network node to: determine a received signal quality associated with each of the secondary transmit signals 131, 132, 231, 241, obtain a computer implemented classification model configured to classify a transmit signal 121, 131, 231, 241 into a successive interference cancelation (SIC) group, classify at least one secondary transmit signal 131, 132, 231, 241 using the classification model, and, if one or more of the secondary transmit signals are classified into the SIC group, and detect the information in the first transmit signal 121, 211 based on a SIC information decoding strategy involving the one or more secondary transmit signals 131, 132, 231, 241 classified into the SIC group.

According to aspects, the control unit 540 is comprised in a wireless device 120 and/or in an access node in a wireless communication system 100, 200.

Figure 5:
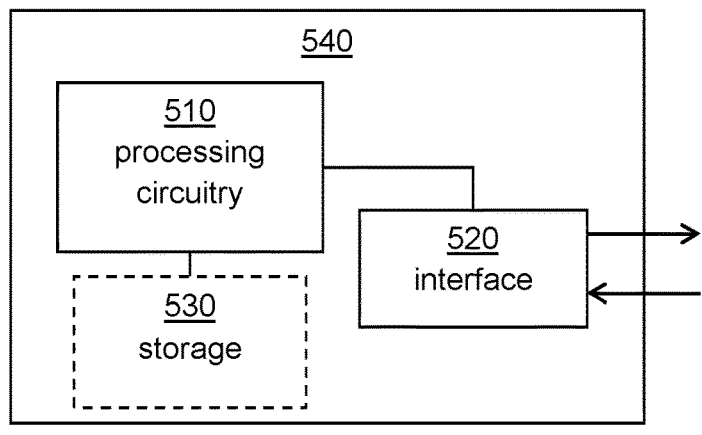

FIG. 5 schematically illustrates, in terms of a number of functional units, the general components of such a control unit 540 according to embodiments of the discussions herein. Processing circuitry 510 is provided using any combination of one or more of a suitable central processing unit CPU, multiprocessor, microcontroller, digital signal processor DSP, etc., capable of executing software instructions stored in a computer program product, e.g., in the form of a storage medium 530. The processing circuitry 510 may further be provided as at least one application specific integrated circuit ASIC, or field programmable gate array FPGA.

Particularly, the processing circuitry 510 is configured to cause the control unit 540 to perform a set of operations, or steps, such as the methods discussed in connection to FIGS. 3 and 4 and the discussions above. For example, the storage medium 530 may store the set of operations, and the processing circuitry 510 may be configured to retrieve the set of operations from the storage medium 530 to cause control unit to perform the set of operations. The set of operations may be provided as a set of executable instructions. Thus, the processing circuitry 510 is thereby arranged to execute methods as herein disclosed. In other words, there is shown control unit 540 comprising processing circuitry 510, a network interface 520 coupled to the processing circuitry 510 and a memory 530 coupled to the processing circuitry 510, wherein the memory comprises machine readable computer program instructions that, when executed by the processing circuitry, causes the control unit 540 to perform operations as discussed herein.

The storage medium 530 may also comprise persistent storage, which, for example, can be any single one or combination of magnetic memory, optical memory, solid state memory or even remotely mounted memory.

The interface 520 is suitable for communications with at least one external device. As such the interface 520 may comprise one or more transmitters and receivers, comprising analogue and digital components and a suitable number of ports for wireline or wireless communication.

The processing circuitry 510 controls the general operation of the control unit 540 e.g., by sending data and control signals to the interface 520 and the storage medium 530, by receiving data and reports from the interface 520, and by retrieving data and instructions from the storage medium 530. Other components, as well as the related functionality, of the control node are omitted in order not to obscure the concepts presented herein.

Figure 6:
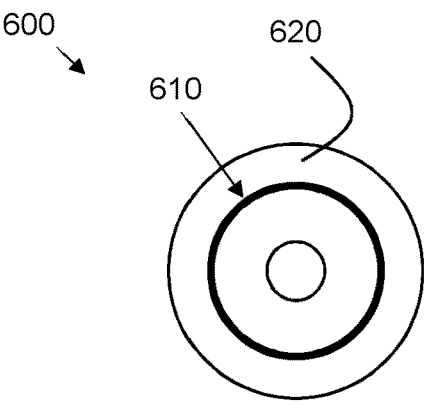
FIG. 6 shows a computer program product, and
FIG. 7 schematically illustrates a virtual node.

FIG. 6 illustrates a computer readable medium 620 carrying a computer program comprising program code means 610 for performing the methods illustrated in, e.g., FIGS. 3 and 4, when said program product is run on a computer. The computer readable medium and the code means may together form a computer program product 600.

The invention claimed is:

1. A computer implemented method, performed by a receiving node in a wireless communications network, the method comprising:

receiving a combined signal comprising a transmit signal and a first interfering signal; and detecting information in the transmit signal by performing a process that comprises:

determining a signal quality associated with the first interfering signal;

using a computer implemented classification model to classify the interfering signal based on the determined signal quality associated with the interfering signal; and as a result of the interfering signal being classified into a successive interference cancelation (SIC) group by the computer implemented classification model, detecting the information in the transmit signal using a SIC information decoding strategy involving the first interfering signal, wherein based on the determined signal quality associated with the interfering signal, the computer implemented classification model is configured to classify the first interfering signal into a group selected from a set of groups consisting of: i) the SIC group and ii) a treat interference as noise (TIN) group.

2. The method of claim 1, wherein detecting the information in the transmit signal further comprises detecting the information using a direct decoding strategy involving a second interfering signal classified into the TIN group.

3. The method of claim 1, wherein determining the signal quality comprises determining the signal quality based on: i) signal to interference and noise ratio (SINR), ii) channel state information (CSI), iii) modulation and coding scheme (MCS), iv) received signal power, v) one or more node positions, and/or transmitted power.

4. The method of claim 1, wherein using the computer implemented classification model comprises using the computer implemented classification model as a model based on any of a look up table and an analytical function.

5. The method of claim 1, wherein the computer implemented classification model is based on: a neural network, a random forest structure, a support vector machine model, a logistic regression algorithm, a Bayes algorithm, a decision tree algorithm, and/or a K-nearest neighbors' algorithm.

6. The method of claim 1, wherein the computer implemented classification model was trained using a-priori recorded values of received signal quality.

7. The method of claim 1, wherein the method further comprises training the computer implemented classification model using recorded values of received signal quality and corresponding detection performance of detecting the information of the transmit signal.

8. The method of claim 1, wherein the computer implemented classification model is configured to determine a transmit parameter for an upcoming transmission of a second transmit signal based on the signal quality, and the method further comprises:

determining the transmit parameter for the upcoming transmission of the second signal using the classification model; and communicating the transmit parameter to a transmitting node.

9. The method of claim 8, wherein the transmit parameter indicates: a modulation and coding scheme (MCS), a transmit power, and/or a hardware parameter.

10. The method of claim 8, wherein determining the transmit parameter comprises determining the transmit parameter based on a predicted detection performance of detecting the information of the transmit signal.

11. The method of claim 1, wherein using the computer implemented classification model to classify the interfering signal based on the determined signal quality associated with the interfering signal comprises classifying the interfering signal based on a predicted detection performance of detecting the information in the transmit signal conditioned on the classification of the first interfering signal.

12. The method of claim 1, wherein using the computer implemented classification model to classify the interfering signal based on the determined signal quality associated with the interfering signal comprises comprising classifying the at least one secondary transmit signal using the classification model based on a predicted detection performance metric comprising any of spectral efficiency, energy consumption, power levels, processing resources, and detection error probability.

13. The method of claim 1, wherein the wireless communications network is an orthogonal frequency-division multiplexing, OFDM, system, and wherein the transmit signals are on a same resource block in the OFDM system.

14. The method of claim 1, performed by a next generation node B, gNB, of a third generation partnership program, 3GPP, defined wireless communication system.

15. The method of claim 1, performed by a wireless device of a 3GPP defined wireless communication system.

16. A non-transitory computer readable storage medium storing a computer program comprising program code means for configuring a control unit to perform the method of claim 1.

17. A control unit for a receiving node in a wireless communications network the control unit comprising:

processing circuitry;

a network interface coupled to the processing circuitry; and a memory coupled to the processing circuitry, wherein the memory comprises machine readable computer program instructions that, when executed by the processing circuitry, causes the network node to:

receive a combined signal comprising a transmit signal and a first interfering signal; and detect information in the transmit signal by performing a process that comprises:

determining a signal quality associated with the first interfering signal, using a computer implemented classification model to classify the interfering signal based on the determined signal quality associated with the interfering signal; and as a result of the interfering signal being classified into a successive interference cancellation (SIC) group by the computer implemented classification model, detecting the information in the transmit signal using a SIC information decoding strategy involving the first interfering signal, wherein based on the determined signal quality associated with the interfering signal, the computer implemented classification model is configured to classify the first interfering signal into a group selected from a set of groups consisting of: i) the SIC group and ii) a treat interference as noise (TIN) group.

18. A wireless device comprising the control unit of claim 17.

19. An access node in a wireless communication system comprising the control unit of claim 17.

\* \* \* \* \*